United States Patent
Beason et al.

(10) Patent No.: US 10,170,014 B2
(45) Date of Patent: Jan. 1, 2019

(54) DOMAIN-SPECIFIC QUESTION-ANSWER PAIR GENERATION

(71) Applicant: International Business Machines Corporation, Armonk, NY (US)

(72) Inventors: William A. Beason, Austin, TX (US); Swaminathan Chandrasekaran, Coppell, TX (US); Anne E. Gattiker, Austin, TX (US); Lakshminarayanan Krishnamurthy, Round Rock, TX (US); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 14/810,723

(22) Filed: Jul. 28, 2015

(65) Prior Publication Data

US 2017/0032689 A1 Feb. 2, 2017

(51) Int. Cl.
  *G09B 7/00* (2006.01)
  *G06F 17/27* (2006.01)

(52) U.S. Cl.
  CPC ........... *G09B 7/00* (2013.01); *G06F 17/2785* (2013.01)

(58) Field of Classification Search
  CPC .................... G06F 17/2785; G06F 17/3043
  See application file for complete search history.

(56) References Cited

U.S. PATENT DOCUMENTS

| | | | | |
|---|---|---|---|---|
| 6,766,320 B1* | 7/2004 | Wang | | G06F 17/3043 |
| 7,428,487 B2* | 9/2008 | Wang | | G06F 17/30716 |
| | | | | 704/10 |
| 7,809,664 B2* | 10/2010 | Heck | | G06Q 10/10 |
| | | | | 704/10 |
| 8,412,514 B1* | 4/2013 | Feng | | G06F 17/2211 |
| | | | | 704/1 |
| 9,875,296 B2* | 1/2018 | Lu | | G06F 17/3064 |
| 2007/0136246 A1* | 6/2007 | Stenchikova | | G06F 17/279 |
| 2008/0201132 A1* | 8/2008 | Brown | | G06F 17/2785 |
| | | | | 704/9 |
| 2008/0294637 A1* | 11/2008 | Liu | | G06F 17/30861 |
| 2011/0125734 A1 | 5/2011 | Duboue et al. | | |

(Continued)

OTHER PUBLICATIONS

Xu, Jinxi, Ralph Weischedel, and Ana Licuanan. "Evaluation of an extraction-based approach to answering definitional questions." Proceedings of the 27th annual international ACM SIGIR conference on Research and development in information retrieval. ACM, 2004. (Year: 2004).*

(Continued)

*Primary Examiner* — Brian L Albertalli
(74) *Attorney, Agent, or Firm* — Arnold B. Bangali

(57) ABSTRACT

A computer-implemented method for creating question-answer pairs is provided. The computer-implemented method includes leveraging domain specific resources including, at least one or more of lexicons, glossaries, or knowledge bases for constructing templates for creating the question-answer pairs. The computer implemented method further includes leveraging user experiences of a plurality of users for constructing templates. The computer implemented method further includes eliminating erroneous question-answer pairs based on templates specifications of a heuristic process of the constructed templates.

11 Claims, 4 Drawing Sheets

(56) References Cited

U.S. PATENT DOCUMENTS

| | | | |
|---|---|---|---|
| 2014/0006012 A1* | 1/2014 | Zhou | G06F 17/30654 704/9 |
| 2014/0297571 A1 | 10/2014 | Beamon et al. | |
| 2015/0142851 A1 | 5/2015 | Gupta et al. | |
| 2015/0178623 A1 | 6/2015 | Balani et al. | |
| 2016/0247068 A1* | 8/2016 | Lin | G06F 17/28 |

OTHER PUBLICATIONS

Filatova, Elena, Vasileios Hatzivassiloglou, and Kathleen McKeown. "Automatic creation of domain templates." Proceedings of the COLING/ACL on Main conference poster sessions. Association for Computational Linguistics, 2006. (Year: 2006).*

Wang et al., "Automatic Question Generation for Learning Evaluation in Medicine", ICWL 2007, LNCS 4823, pp. 242-251, 2008.

Chali et al., "Towards Automatic Topical Question Generation", Proceedings of COLING 2012: Technical Papers, pp. 475-492, Mumbai, Dec. 2012.

Chali et al., "Towards Topic-to-Question Generation", Computational Linguistics, vol. 41, No. 1, 2015, 20 pages.

Zheng et al., "K2Q: Generating Natural Language Questions from Keywords with User Refinements", Proceedings of the 5th International Conference on Natural Language Processing, pp. 947-955, Nov. 8-13, 2011.

Heilman et al., "Good Question! Statistical Ranking for Question Generation", HLT '10 Human Language Technologies: The 2010 Annual Conference of the North American Chapter of the Association for Computational Linguistics, May 2010, pp. 609-617.

Kuyten et al., "Fully Automated Generation of Question-Answer Pairs for Scripted Virtual Instruction", Lecture Notes in Computer Science, vol. 7502, 2011, pp. 1-14.

Georg et al., "Visualizing the Importance of Medical Recommendations with Conversational Agents", IVA 2008, LNAI 5208, pp. 380-393, 2008.

Awad et al., "Automatic Generation of Question Bank Based on Pre-defined Templates", International Journal of Innovations and Advancement in Computer Science, vol. 3, Issue 1, Apr. 2014, pp. 80-87.

Chambers et al., "Template-Based Information Extraction without the Templates", Proceedings of the 49th Annual Meeting of the Association for Computational Linguistics, 2011, pp. 976-986.

Fader et al., "Paraphrase-Driven Learning for Open Question Answering", The 51st Annual Meeting of the Association for Computational Linguistics, 2013, 11 pages.

Kotov et al., "Towards Natural Question-Guided Search", World Wide Web Conference, Apr. 26-30, 2010, 10 pages.

Ali et al., "Automatic Question Generation from Sentences", TALN 2010, Montreal, Jul. 19-23, 2010, pp. 1-6.

Heilman, "Automatic Factual Question Generation from Text", Submitted in partial fulfillment of the requirements for the degree of Doctor of Philosophy in Language and Information Technologies, Language Technologies Institute School of Computer Science, Carnegie Mellon University, 2011, pp. 1-195.

Wolfe, "Automatic Question Generation from Text—An Aid to Independent Study", Navy Personnel Research and Development Center, 1976, pp. 104-112.

Xu et al., "Automatic Question Generation and Answer Judging: A Q&A Game for Language Learning", Spoken Language Systems Group, MIT Computer Science and Artificial Intelligence Laboratory, United States, pp. 1-4.

Healthcare.gov, "Glossary", https://www.healthcare.gov/glossary/, pp. 1-11, printed on Jan. 8, 2015.

NFL-360, "Glossary", http://www.nfl-360.com/glossary, pp. 1-7, printed on Jan. 8, 2015.

Salonweb, "Glossary of Hair Styling Terms", http://www.salonweb.com/pro/glossary.htm, pp. 1-12, printed on Jan. 8, 2015.

\* cited by examiner

DOMAIN-SPECIFIC QUESTION-ANSWER PAIR GENERATION

BACKGROUND

The present invention relates generally to the field of computing, and more particularly to creation of question-answer (QA) pairs, for training and testing of a question-answering system. Querying a database to retrieve an answer, such as, for example, telling a robot to perform an action, or teaching a computer to play a game, are tasks requiring communication with machines including Question-Answering (QA) systems. A QA system is a computer science discipline within the fields of information retrieval and natural language processing (NLP), which is concerned with building systems that automatically answer questions posed by humans in natural language form. A QA system implementation may construct its answers by querying a structured database of knowledge or information, based on a knowledge base query of the structured database. A QA system may construct its answers from unstructured natural language documents.

SUMMARY

According to one embodiment, a computer-implemented method for creating question-answer pairs is provided. The computer-implemented method includes leveraging domain specific resources including, at least one or more of lexicons, glossaries, or knowledge bases for constructing templates for creating the question-answer pairs. The computer implemented method further includes leveraging user experiences of a plurality of users for constructing templates. The computer implemented method further includes eliminating erroneous question-answer pairs based on templates specifications of a heuristic process of the constructed templates.

According to another embodiment, for creating question-answer pairs is provided. The computer system includes one or more processors, one or more computer-readable memories, one or more computer-readable tangible storage devices, and program instructions stored on at least one of the one or more storage devices for execution by at least one of the one or more processors via at least one of the one or more memories. The computer system includes program instructions to leverage domain specific resources including, at least one or more of lexicons, glossaries, or knowledge bases for constructing templates for creating the question-answer pairs. The computer system further includes program instructions to leverage user experiences of a plurality of users for constructing templates. The computer system further includes program instructions to eliminate erroneous question-answer pairs based on templates specifications of a heuristic process of the constructed templates.

According to yet another embodiment, a computer program product for creating question-answer pairs is provided. The computer program product includes one or more computer-readable tangible storage devices and program instructions stored on at least one of the one or more storage devices. The computer program product includes program instructions to leverage domain specific resources including, at least one or more of lexicons, glossaries, or knowledge bases for constructing templates for creating the question-answer pairs. The computer program product further includes program instructions to leverage user experiences of a plurality of users for constructing templates. The computer program product further includes program instructions to eliminate erroneous question-answer pairs based on templates specifications of a heuristic process of the constructed templates.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
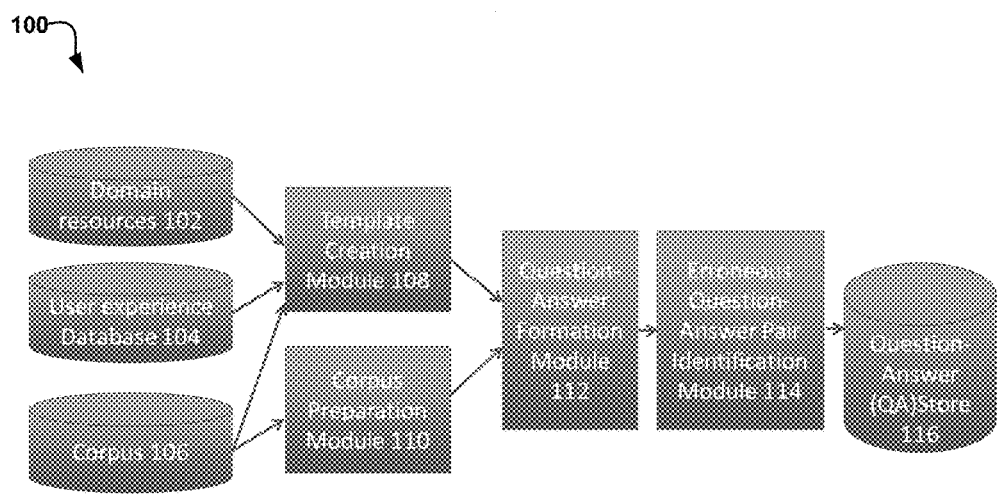
FIG. 1 illustrates a question-answer pair computer system environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention relate generally to the field of computing, and more particularly to creation of question-answer pairs. The following described exemplary embodiments provide a system, method and program product for creating question-answer pairs for training and testing a question-answering system. According to embodiments, the question-answering system may take as input natural language questions and produce answers, usually in text form. Another use for question-answer pairs may be in education, where, for example, reading comprehension can be tested or self-study facilitated.

Question-answer pair creation for training/testing question-answering systems, however, drives certain desirable attributes that this invention provides. For example, training in this context may include a determination of a statistical or machine-learning model that may give good performance at the question-answering task. Such models are successful when they are trained with questions that are similar to those that will be asked by end users. Questions users will ask are functions of the domain, or topic area, of interest, as well as by attributes of the users themselves. As a result, according to embodiments, the invention incorporates domain-specific knowledge and knowledge of users in its question-answer pair generation. In addition, large corpora that form the knowledge base for question-answering services, desire for rapid turn-around and requirement for non-erroneous questions makes an approach that avoids complicated and time-consuming Natural Language Processing desirable. Finally, embodiments of the present invention address a need for accuracy in training and testing data and ability to reject erroneous question-answer pairs that may be desirable.

Referring now to FIG. 1, an exemplary flow diagram of an integrated systems environment, for creating question-answer pairs, according to embodiments, is depicted.

It should be appreciated that FIG. 1 provides only an illustration of one implementation and does not imply any limitations with regard to the environments in which different embodiments may be implemented. Many modifications to the depicted environment of FIG. 1 may be made based on design and implementation requirements.

The question-answer pair generation system 100 may be operated by a plurality of computing systems or a plurality of server computing systems, for performing the creation of question-answer pairs for training or testing of the question-answering system. For example, the server computing system may be, for example, a mainframe server computer system such as a management server, a web server, or any other electronic device or computing system capable of transmitting data, within the question-answer pair generation system 100, for performing the creation of question-answer pairs for training or testing of the question-answering, according to at least one embodiments of the present invention. For example, according to at least one implementation, a template creation module 108 of the question-answer pair generation system 100 templates for identifying facts included in a text.

The facts are transmitted into questions and the answers are extracted based on the templates created by the template creation module. According to embodiments, the templates may contain "harbingers" which are phrases that indicate the text contains an associated fact. Examples of harbingers may include, for instance, "caused by" and "located in" which indicate information is given on what causes or what the location is of the concept described by the subject-of-interest. E.g., "Diabetes is a disease caused by genes" contains the harbinger "caused by" and provides a fact about diabetes. In addition to the harbingers, templates may contain question-forming strings and, optionally, answer-forming strings. According to embodiments, question-answer pair formulation module 112 returns as answer depending on what the question-answering system needs for training.

For example, options include the entire passage of text that contains the harbinger; the subset, e.g., sentence or phrase, of the text that contains the harbinger; or text that follows the harbinger, optionally preceded by a given string. For example, the question-forming and answer-forming strings may be used in cooperation with the harbingers to create the questions and answers. An example template has harbinger "located in", question-forming string, "Where is <term> located?" and an answer-forming string that specifies "In" followed by the text that follows the harbinger. Text from a glossary may include, for instance: "Abdominal fat: Fat located in the abdomen." The extracted QA pair for the "located in" harbinger is: "Where is abdominal fat located? In the abdomen" Multiple question phrasings can be associated with each harbinger, e.g., "Where is abdominal fat located?", "What is the location of abdominal fat?", "Where would I find abdominal fat?" Similarly, multiple answer phrasings can also be associated with each answer, e.g., "In the abdomen" and "The abdomen." These multiple-phrasings are useful for training question-answering systems since they represent different ways a user may ask a question. Note for a glossary, a special case, e.g., blank, harbinger can be defined that matches every term and creates a "What is <term>?" question, potentially along with other questions, such as "What does <term> refer to?"

Template creation module 108 further incorporates domain-specific resources 102, such as lists of synonyms, antonyms, keywords and knowledge bases. In other words, templates can be tailored for specific domains. For example, in the travel domain, lodging, hotel and accommodation all refer to the same thing, i.e. they are synonymous or nearly-synonymous. In a different domain, e.g., legal, accommodation may more appropriately be a near synonym of reconciliation or compromise. The question-forming strings may be specified such that the appearance of one of those terms in an initial question or answer would trigger creation of additional questions or answers that substitute the other synonymous terms for the first one. For example, a match of the harbinger "is located in" in the sentence, "Smithville's hotel is located on Jones Road" would instantiate creation of initial question "Where is Smithville's hotel located?" Using a travel-domain dictionary that specifies "hotel", "lodging" and "accommodation" as interchangeable terms (because they are synonymous or nearly synonymous), the template may specify that the additional questions "Where is Smithville's lodging located?" and "Where is Smithville's accommodation located?" be created. Such alternative phrasings are desirable for training a question-answering system, since they reflect multiple ways the users of the question-answering system may ask questions. Similarly, a template with harbinger, "must be accommodated by" in a travel-domain-tailored template, from the sentence, "Guests must be accommodated by hotels near the convention center" could specify question-forming strings that would create the question, "How are guests to be housed?" In a legal-domain-tailored version of the template with the same harbinger, the sentence, "The widow's needs must be accommodated by the parties specified in the deceased's will" could specify question-forming strings that would create the question "How are the widow's needs to be met?", i.e., not "How are the widow's needs to be housed?"

Template creation module 108 may also incorporate a user experience database 104 for creating the question-answer pairs. For example, the user experience database 104 may include demographic user attributes, such as age and location. For example, another source of the user experience may include social media or blogs, for instance. Yet another source is a store of historical questions users have asked. Incorporating user experience can take the form, for example, of determining question phrasings. E.g., if most "where" user questions from a group of users take the form of "Where is <term>", The template's question-forming string may specify that questions based on matching the harbinger "is located in" take the form, "Where is <term>" for users with similar attributes. E.g., in the above example, "Where is Smithville's hotel?" For example, if, instead, most user "where" questions in the historical store from a group of users take the form, "Where can I find <term>", the template's question-forming string could take the form, "Where can I find <term>" for users with similar attributes with resulting question "Where can I find Smithville's hotel." Similarly, a template could specify simple "Where is <term>" questions for training a question-answering system for younger users, but a more formal and precise "Where is <term> located" for older users or non-native language speakers.

Appropriate tone for questions may be learned, for example, by analyzing blogs written by the question-answer system's users. Templates of the template creation module 108 may also specify which "erroneous question-answer pair" heuristics to apply and, potentially, parameters for those heuristics which require them, e.g., a number of words for a heuristic that classifies question-answer pairs as erroneous if the question's answer contains fewer than that number of words, as described below. According to embodiments, corpus 106 is the body of text from which the question-answering system draws to answer user questions, and from which the question-answer pairs in accordance with the invention are generated. For example, the corpus 106 may be prepared for its use by corpus preparation module 110 for creating question-answer pairs of the question-answer pair generation system 100. For example, pdf documents can be converted to text, text tokenized and sentence boundaries recognized. The method can work on passages of text that include paragraphs, sentences, sub-sentences, etc.

In pursuit of speed, simplicity and accuracy at least one embodiment of this invention targets corpus content that follows the format of term-definition. For example, as briefly described, term-definition text is text that provides a term and a short definition or explanation. Glossary entries are good examples, but other sources exist as well as described in the following. The definitions/explanations can be text blocks of various lengths, e.g., partial sentences, sentences or multiple sentences. The simple structure of term-definition text, along with a template-based approach, makes it possible to extract QA pairs without requiring complicated Natural Language Processing, which can be time-consuming and error-prone.

For example, natural language processing (NLP) techniques including sentence parsing, anaphora resolution and named entity recognition are time-consuming and can result in errors. Although these techniques can be used in conjunction with the present invention, use of term-definition text makes it possible to avoid them if desired. Using term-definition text trades being able to utilize only a subset of all text for simplicity, speed and accuracy. Embodiments of the present invention utilize templates to identify facts included in the text. The facts are turned into questions whose subjects-of-interest are the terms. The answers are extracted from the facts based on the templates. A post-processing check step is included to identify cases where the assumptions of the method are violated to weed out any bad pairs. The outputs are the extracted QA pairs of a QA pair store 116. Term-definition text is ubiquitous in today's enterprise corpora and web resources. Example sources include glossaries, Wikipedia entries and general unstructured text.

Term-definition text may be available in glossaries, which in turn, are surprisingly common in diverse enterprise corpora, e.g., see: Healthcare Marketplace: https://www.healthcare.gov/glossary/; Football: http://www.nfl-360.com/glossary; Hair Care: http://www.salonweb.com/pro/glossary.htm. Another example is the start of Wikipedia articles, which nearly always start out with a short definition or explanation of the subject. E.g., the beginnings three of the first Wikipedia topics follow. "Anarchism: Anarchism is a political philosophy that advocates stateless societies based on non-hierarchical free associations."—"Albedo: Albedo, or reflection coefficient, derived from Latin albedo & quot;whiteness" (or reflected sunlight) in turn from albus "white," is the diffuse reflectivity or reflecting power of a surface. It is the ratio of reflected radiation from the surface to incident radiation upon it."—"A: A (named a, plural aes) is the first letter and vowel in the ISO basic Latin alphabet, similar to the Ancient Greek letter alpha, from which it derives.

The term-definition text can also be recognized and extracted from general text by identifying harbingers near the beginning of a sentence. The text proceeding the harbinger is identified as playing the role of "term" in the above strategy, disallowing sentences with references to proceeding text in the surrogate-term, e.g., "This, these, he, his, she, her, it, its, the preceding". For example, if desired, more complex NLP can be applied to extend the method beyond simple structures. Also, one can choose sentences to parse based on importance-placement in the document, e.g., first sentence of sections or paragraphs. Templates themselves can be extracted from the text and important or highly-occurring templates can be selected. Templates can be biased toward including essential descriptive information.

Erroneous question-answer pair identification module 114 utilizes heuristics to analyze and negate erroneous question-answer pairs that are created using the harbinger match, question-forming strings and answer-forming strings specified in a template. For example, one aim of the heuristics is to determine whether or not the term in term-definition text is indeed the subject-of-interest of the harbinger and following text. If it is not, the question may be erroneous. Examples of such heuristics include, given term-definition text as prepared corpus, determining how early in the definition/explanation the harbinger occurs.

Generally, for instance, the earlier the term occurs, the more likely it is that the harbinger is referring to the term. Since the term is used as the subject-of-interest of the question that, in turn, increases the chances the question is good. A measure of how early the harbinger occurs, e.g., as a function of number or words or characters, can be considered a score for that heuristic. The template could specify a threshold for earliness of harbinger occurrence, beyond which the question is considered bad, or it could specify whether or not the heuristic related to earliness should be applied at all for the template's associated harbinger. Other heuristics also aim at determining whether or not the term in term-definition text is indeed the subject-of-interest of the harbinger and following text. An example is based on term and verb agreement in number. E.g., if the term is singular, but the verb or verbs in the following text are plural, that following text is unlikely to refer to the term and a question made from that text may be erroneous. For example, this process may be especially useful for cases where definition or explanation text spans multiple sentences. Facts contained in sentences that do not contain the term may or may not pertain to the term. This rule finds cases where the term is unlikely to be the subject-of-interest of the text containing the harbinger. For example, the score on the heuristic can be a binary one, with value one for agreement and zero for non-agreement, with the threshold set at 0.5.

Another aim of the heuristics can be to make sure the extracted answer is a reasonable answer, e.g., that it contains at least a threshold number of words. For example, assuming the answer is the text of the harbinger-containing sentence that follows the harbinger, a threshold can be set for minimum length of that text. The number of words in the answer, or whether or not that number exceeds a threshold, can also be considered a score for the heuristic. Each template can specify which heuristics should be applied to question-answer pairs generated with that template. It can alternatively or in addition specify a threshold on the heuristic's score that needs to be exceeded to classify the question as not erroneous.

For example, the heuristics choices or threshold values can be user or domain-specific. E.g., the maximum number of words that precede a harbinger before triggering a classification of erroneous could be high in a highly-technical medical domain or for a question-answering system aimed at sophisticated highly-technical users. One reason it could be high is that highly technical text may contain longer explanatory text related to a term. The maximum number of words that precede a harbinger before triggering a classification of erroneous could be lower in a less technical domain or for younger users. Similarly, the template could specify that grammar-consistency rules, like the term-verb number agreement rule described above, be relaxed for a question-answer system aimed at informal text, such as blogs or tweets.

Figure 2:
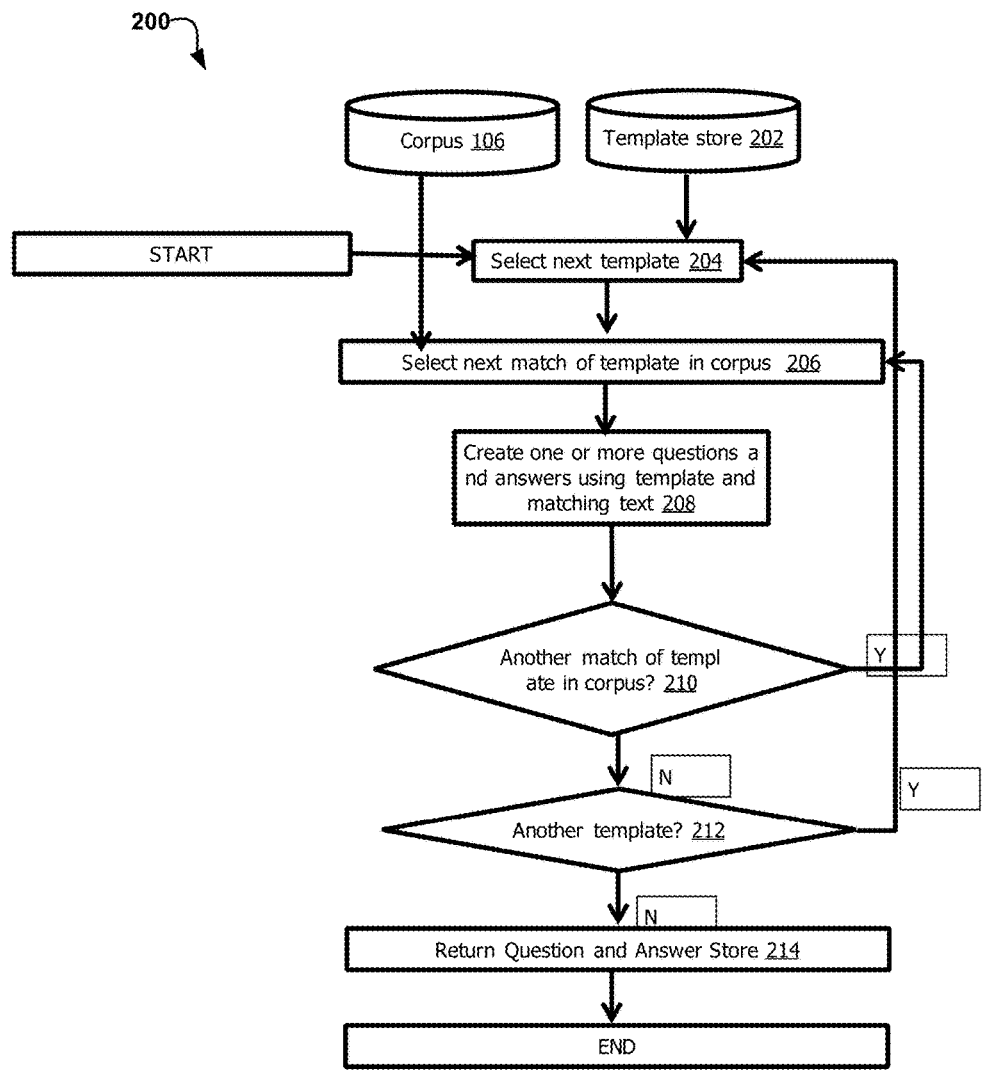
FIG. 2 is an operational flow diagram illustrating the steps carried out by a program for creation of question-answer pairs according to at least one embodiment.

FIG. 2 illustrates a flow diagram 200 for performing program operations by the question-answer formulation module 112, according to embodiments. In the depicted flow, for each template, matches are found in the corpus 106.

It should be appreciated that FIG. 2 provides only an illustration of one implementation and does not imply any limitations with regard to the environments in which different embodiments may be implemented. Many modifications to the depicted environment of FIG. 3 may be made based on design and implementation requirements. At step 204, the question-answer formulation module 112 selects a plurality of templates. At step 206, the question-answer formulation module 112 selects a next match of the template in corpus 106.

At step 208, question-answer formulation module 112 creates questions and answers using the template from template store 202 and matching text and adds the created questions and answers to an intermediate store for retrieval. At decision 210, question-answer formulation module 112 determines if another match of templates is available in the corpus 106. If a match is available in the corpus, then at step 206, the question-answer formulation module selects a next match of the template in corpus. However, if another match is not available, then at decision 212 question-answer formulation module 112 determines if another template is available. If another template is available, then at step 204, the question-answer formulation module 112 selects a template. However, if another template is not available, then, at step 214, the question-answer formulation module 112 returns an intermediate store.

Figure 3:
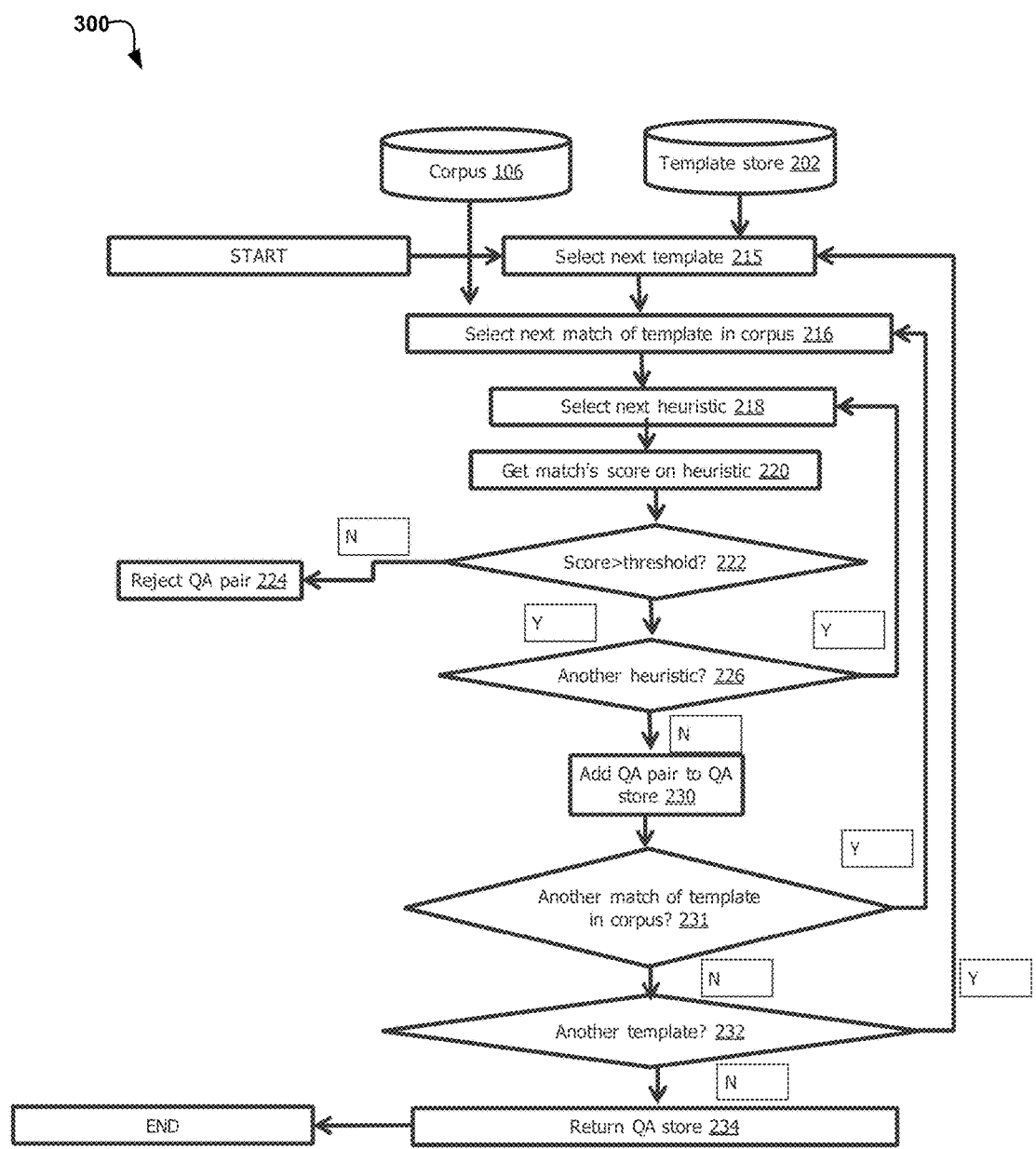
FIG. 3 is an operational flow diagram for performing program operations by a program for utilizing heuristics for analyzing and negating erroneous question-answer pairs, according to at least one embodiment.

FIG. 3 illustrates a flow diagram 300 for performing program operations by the erroneous question-answer pair identification module 114 for utilizing heuristics for analyzing and negating erroneous question-answer pairs that are created using the harbinger match, question-forming strings and answer-forming strains specified in a template, according to embodiments. According to embodiments, in the depicted environment, a score on a heuristic is calculated and compared to a threshold. Lower scores indicate higher likelihood that the question-answer pair is erroneous. If the score fails to meet the threshold, the questions made from the match are rejected. If not, the next heuristic is evaluated. If the heuristics are exhausted without any failing to exceed the threshold, the questions made from the match are added to the QA store 116. The loop continues to loop through the matches to the current template. When these matches are exhausted, the outer loop continues to the next template. When all templates are exhausted, the QA store 116 is returned.

It should be appreciated that FIG. 3 provides only an illustration of one implementation and does not imply any limitations with regard to the environments in which different embodiments may be implemented. Many modifications to the depicted environment of FIG. 3 may be made based on design and implementation requirements, according to embodiments. At step 215, the erroneous question-answer pair identification module 114 selects template. At step 216, the erroneous question-answer pair identification module 114 selects next match of template in corpus 106. At step 218, the erroneous question-answer pair identification module 114 selects heuristic specified by the template. At step 220, the erroneous question-answer pair identification module 114 acquires match's score on the heuristic. At decision 222, the erroneous question-answer pair identification module 114 determines a score threshold for the acquired score. For example, the erroneous question-answer pair identification module 114 determines if the score is greater than a threshold.

The thresholds can be a global setting or a template-specific setting. If the score fails to exceed the threshold, then, at step 224, the erroneous question-answer pair identification module 114 rejects the QA pair and the QA pair will no longer be considered. However if the score exceeds the threshold, at decision 226, the erroneous question-answer pair identification module 114 selects the next heuristic specified in the template. If no more heuristics exist, then at step 230 the erroneous question-answer pair identification module 114 adds the QA pair to the QA store 116. At decision 231, the erroneous question-answer pair identification module 114 searches for another match of the current template in corpus 106. If matches are available, then at step 216 another match is selected. If no further matches are available, at decision 232, the erroneous question-answer pair identification module 114 searches for another template. If templates are available, then at step 216, the erroneous question-answer pair identification module 114 selects template. However, if the templates are not available, then at step 234, the erroneous question-answer pair identification module 114 selects template returns the QA store to the QA repository.

Figure 4:
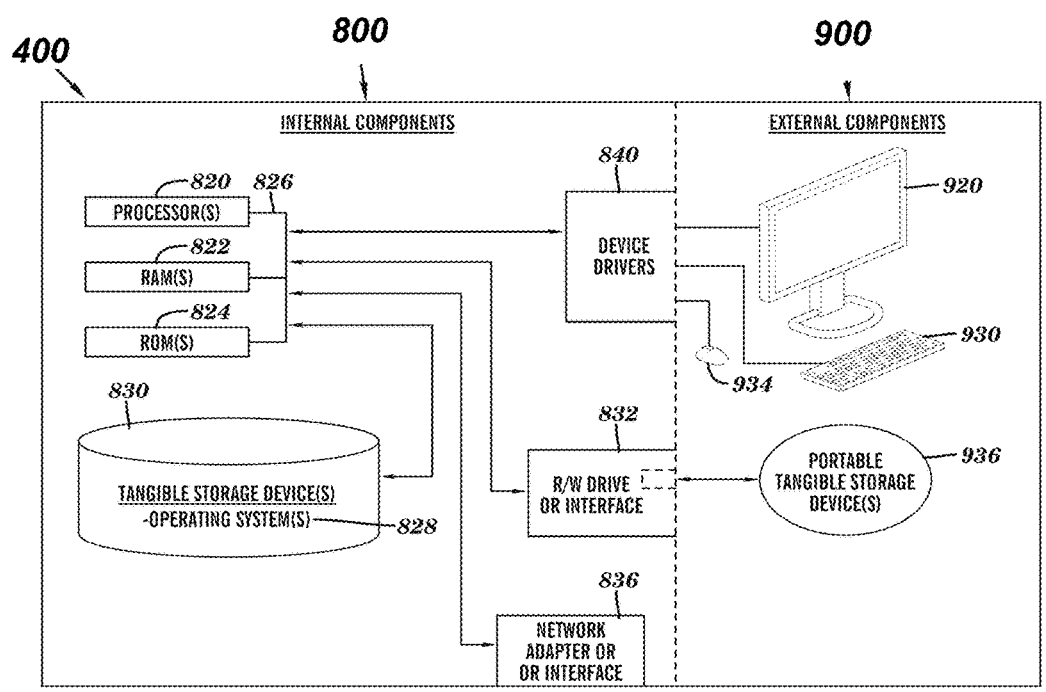
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Template creation module 108, corpus preparation module 110, question-answer formulation module 112, and erroneous question-answer pair identification module 114, may include respective sets of internal components 800 and external components 900 illustrated in FIG. 4. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 is stored on one or more of the respective computer-readable tangible storage medium 830 for execution by one or more of the respective processors 820 via one or more of the respective RAMs 822 (which typically include cache memory). In the embodiment illustrated in FIG. 4, each of the computer-readable tangible storage medium 830 is a magnetic disk storage device of an internal hard drive.

Alternatively, each of the computer-readable tangible storage medium 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage medium 936 such as a CD-ROM, DVD, memory stick, magnetic tape, magnetic disk, optical disk or semiconductor storage device. Software program of either one of template creation module 108, corpus preparation module 110, question-answer formulation module 112, and erroneous question-answer pair identification module 114 can be stored on one or more of the respective portable computer-readable tangible storage medium 936, read via the respective R/W drive or interface 832 and loaded into the respective hard drive 830.

Each set of internal components 800 also includes network adapters or interfaces 836 such as a TCP/IP adapter cards, wireless Wi-Fi interface cards, or 3G or 4G wireless interface cards or other wired or wireless communication links. Software program of either one of template creation module 108, corpus preparation module 110, question-answer formulation module 112, and erroneous question-answer pair identification module 114 can be downloaded from an external computer via a network for example, the Internet, a local area network or other, wide area network) and respective network adapters or interfaces 836. From the network adapters or interfaces 836, the software programs such as template creation module 108, corpus preparation module 110, question-answer formulation module 112, and erroneous question-answer pair identification module 114 may be are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the computer-implemented method comprising:
    retrieving question-answer pairs from a database;
    constructing question-answer pair templates, wherein the constructing is based on leveraging domain specific resources and user experiences of a plurality of users; and
    eliminating erroneous question-answer pairs from the retrieved question-answer pairs based on specifications of a heuristic process of the constructed templates, wherein the heuristic process is based on a term definition text operation that analyzes question-forming strings and answer-forming strings based on a plurality of glossaries and sentence formulations of the constructed templates.

2. The computer-implemented method of claim 1, wherein the templates identify facts of natural language text.

3. The computer-implemented method of claim 1, wherein the templates include a question forming text with paraphrases.

4. The computer-implemented method of claim 1, wherein a corpus of text is utilized to generate the question-answer pairs.

5. A computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    program instructions to retrieve question-answer pairs from a database;
    program instructions to construct question-answer pair templates, wherein the constructing is based on leveraging domain specific resources and user experiences of a plurality of users; and
    program instructions to eliminate erroneous question-answer pairs from the retrieved question-answer pairs based on specifications of a heuristic process of the constructed templates, wherein the heuristic process is based on a term definition text operation that analyzes question-forming strings and answer-forming strings based on a plurality of glossaries and sentence formulations of the constructed templates.

6. The computer system of claim 5, wherein the templates identify facts of natural language text.

7. The computer system of claim 5, wherein the template is a question forming text with paraphrases.

8. The computer system of claim 5, wherein a corpus of text is utilized to generate the question-answer pairs.

9. A computer program product comprising:
    one or more computer-readable tangible storage devices and program instructions stored on at least one of the one or more storage devices, the program instructions comprising:
    program instructions to retrieve question-answer pairs from a database;
    program instructions to construct question-answer pair templates, wherein the constructing is based on leveraging domain specific resources and user experiences of a plurality of users; and
    program instructions to eliminate erroneous question-answer pairs from the retrieved question-answer pairs based on specifications of a heuristic process of the constructed templates, wherein the heuristic process is based on a term definition text operation that analyzes question-forming strings and answer-forming strings based on a plurality of glossaries and sentence formulations of the constructed templates.

10. The computer program product of claim 9, wherein the templates identify facts of natural language text.

11. The computer program product of claim 9, wherein a corpus of text is utilized to generate the question-answer pairs.

* * * * *